(12) United States Patent
Francis

(10) Patent No.: US 10,037,557 B2
(45) Date of Patent: Jul. 31, 2018

(54) CONNECTING TRANSACTION ENTITIES TO ONE ANOTHER SECURELY AND PRIVATELY, WITH INTERACTION RECORDING

(71) Applicant: Genesys Telecommunications Laboratories, Inc., Daly City, CA (US)

(72) Inventor: Ethan Francis, Dallas, TX (US)

(*) Notice: Subject to any disclaimer, the term of this patent is extended or adjusted under 35 U.S.C. 154(b) by 932 days.

(21) Appl. No.: 14/289,612

(22) Filed: May 28, 2014

(65) Prior Publication Data
US 2015/0348151 A1 Dec. 3, 2015

(51) Int. Cl.
*G06Q 30/06* (2012.01)

(52) U.S. Cl.
CPC .............. *G06Q 30/0611* (2013.01)

(58) Field of Classification Search
CPC ..................................................... G06Q 30/00
See application file for complete search history.

(56) References Cited

U.S. PATENT DOCUMENTS

| | | | | |
|---|---|---|---|---|
| 8,533,030 B1* | 9/2013 | Dhir | ....................... | G06Q 30/02 705/14.53 |
| 9,225,833 B1* | 12/2015 | Koster | ................ | H04M 3/42221 |
| 2003/0043981 A1* | 3/2003 | Lurie | .................... | H04M 15/00 379/114.25 |
| 2003/0126090 A1* | 7/2003 | Fukuoka | ................ | G06Q 10/10 705/54 |
| 2007/0189520 A1* | 8/2007 | Altberg | .................. | G06Q 30/02 380/30 |
| 2008/0228821 A1* | 9/2008 | Mick | ....................... | G06F 21/10 |
| 2009/0012874 A1* | 1/2009 | Case | ....................... | G06Q 30/06 705/26.42 |
| 2009/0012970 A1* | 1/2009 | Ziv | ..................... | G06F 17/30705 |
| 2009/0138320 A1* | 5/2009 | Schmidt | ................ | G06Q 10/06 705/14.4 |
| 2009/0207979 A1 | 8/2009 | Russell | | |
| 2009/0248628 A1* | 10/2009 | Toyoshima | ............ | G06Q 10/06 |
| 2012/0323997 A1 | 12/2012 | Mezhibovsky et al. | | |
| 2013/0329865 A1 | 12/2013 | Ristock et al. | | |
| 2014/0126713 A1 | 5/2014 | Ristock et al. | | |
| 2014/0316853 A1* | 10/2014 | Lyren | ................. | G06Q 30/0202 705/7.31 |

* cited by examiner

*Primary Examiner* — Kathleen Palavecino
*Assistant Examiner* — Abby J Flynn

(57) ABSTRACT

A system and method for connecting first and second transaction entities includes displaying a transaction associated with the first transaction entity where the transaction may be associated with a category of transactions. An option is also displayed to request interaction with the first transaction entity. A processor receives selection of the option and transmits a command to establish the interaction between the first transaction entity and the second transaction entity. The interaction is recorded and stored in a data storage device. The processor analyzes the recorded interaction and, according to one embodiment, detects one or more keywords in the recording. A notification may be transmitted in response to the detected one or more keywords. In another embodiment, the processor may detect a trend from analysis of the recording and may make a modification relating to future transactions associated with the category of transactions based on the detected trend.

7 Claims, 10 Drawing Sheets

CONNECTING TRANSACTION ENTITIES TO ONE ANOTHER SECURELY AND PRIVATELY, WITH INTERACTION RECORDING

TECHNICAL FIELD

This disclosure relates generally to the field of telephony-supported, electronic-based commerce.

BACKGROUND OF THE RELATED ART

Internet-accessible marketplaces in which sellers offer goods or services for sale or barter to prospective buyers are well-known. Traditional web sites like eBay® and Yahoo!® Auctions were some of the earliest and most popular sites on the Web. More recently, P2P sharing sites (e.g., Airbnb, Uber, and others) have expanded the ability of individuals to seek out and obtain information, goods and services. While these sites and services provide significant advantages to the individuals using them, to retain their value (at least for the service provider offering them), these types of marketplaces generally need to keep the buyer and seller from directly connecting with one another and exchanging personal information, at least during the time period during which negotiations occur. Otherwise, the service provider becomes disintermediated, and its value is negated as the buyer and seller can easily circumvent the provider's revenue collection model. Service providers have attempted to address this problem by various techniques, both technical (private messaging systems to ensure that a buyer and seller cannot broker a deal outside of the site/service) and non-technical (e.g., terms-of-use restrictions, contract restrictions, and the like).

These solutions, however, are costly, and in many cases do not adequately address the problems in the art.

BRIEF SUMMARY

According to one embodiment, the present invention is directed to a system and a method for connecting first and second transaction entities. A processor provides for display on a display device, a transaction associated with the first transaction entity, where the transaction is associated with a category of transactions. The processor further provides, for display on the display device, an option to request interaction with the first transaction entity. The processor receives selection of the option to request interaction from the second transaction entity. In response to selection of the option, the processor transmits a command to establish the interaction between the first transaction entity and the second transaction entity. The interaction is recorded by a recording device and stored in a data storage device. The processor analyzes the recorded interaction and detects, based on the analyzing, one or more keywords in the recording. The processor transmits a notification in response to the detected one or more keywords.

According to one embodiment of the invention, the transmitted notification is an alert to at least one of an administrator, first transaction entity, or second transaction entity.

According to one embodiment of the invention, the detected one or more keywords are indicative of exchange of personal identification information.

According to one embodiment of the invention, the status of at least one of the first transaction entity or second transaction entity is modified based on the detected one or more keywords.

According to one embodiment of the invention, the recording is modified based on the detected one or more keywords.

According to one embodiment of the invention, the processor analyzes the recorded interaction and detects, based on the analyzing, a trend for the category of transactions. The processor makes a modification relating to future transactions associated with the category of transactions based on the detected trend.

According to one embodiment of the invention, the interaction between the first and second transaction entities is established without disclosing personal identification information of the first and second transactions entities. The personal identification information may be contact information used by the first and second transactions entities for general communication including communication unrelated to the transaction.

According to one embodiment of the invention, in response to the command to establish the interaction, a first interaction request is transmitted to the first transaction entity and a second interaction request is transmitted to the second transaction entity, wherein in response to acceptance of the first and second interaction requests, communication is established between the first and second transaction entities.

According to one embodiment of the invention, the processor retrieves preference information stored for the first transaction entity and transmits the command to establish the interaction consistent with the retrieved preference information. The preference may relate to at least one of times or media channels for engaging in the interaction.

According to one embodiment of the invention, the interaction is a telephony interaction.

According to one embodiment of the invention, the analyzing includes identifying one or more keywords in the recording.

According to one embodiment of the invention, the detecting of the trend includes identifying the one or more keywords in a subset of analyzed recordings.

According to one embodiment of the invention, the making the modification includes prompting a user posting one of the future transactions for data relating to the identified one or more keywords.

BRIEF DESCRIPTION OF THE DRAWINGS

For a more complete understanding of the disclosed subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
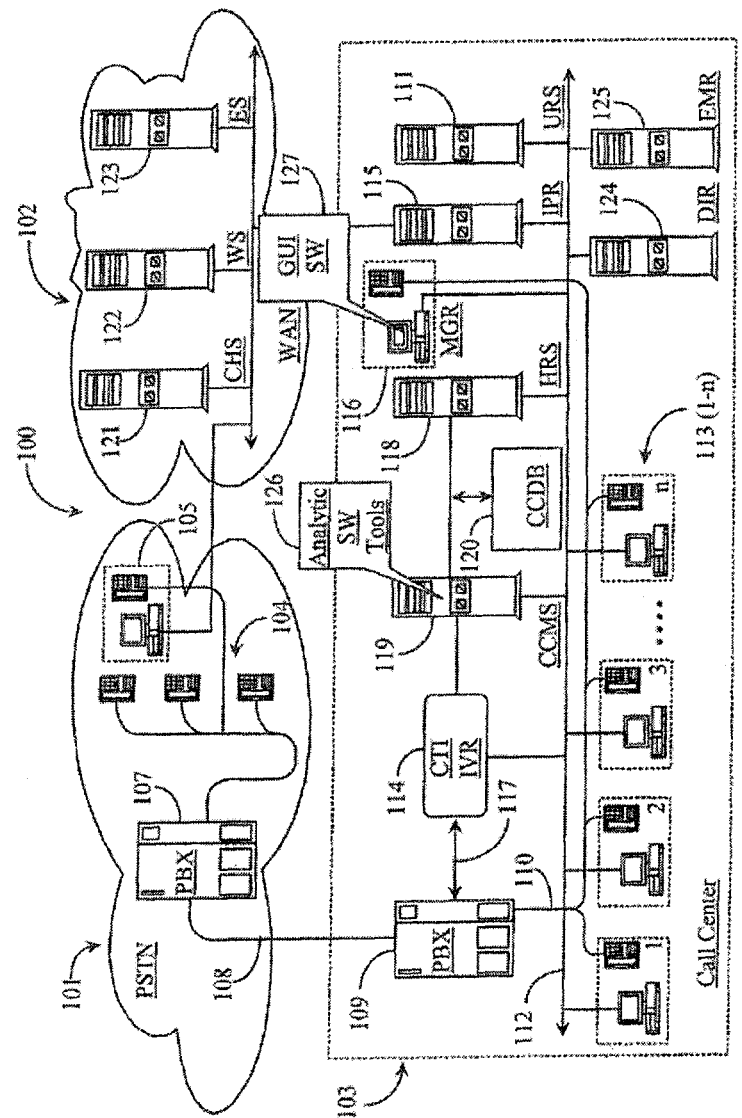
FIG. 1 is a block diagram of a telephony-based computing infrastructure, such as a call center, in which the techniques described herein may be practiced according to one embodiment of the invention.

This disclosure provides a method and telephony-based, services platform that enables prospective buyers and sellers to interact concerning a possible transaction but without exposure of sufficient identifying information that might disintermediate the service provider from participating in the transaction.

According to an embodiment, an "intelligent connect" transaction method is operative within a telephony-based computing infrastructure, such as a call center, and enables first and second entities (e.g., a prospective buyer and seller of a commodity) to interact with one another while provably protecting entity privacy and ensuring against transaction abuse. Typically, the telephony-based computing infrastructure includes an interactive voice response unit (IVR) function. All or part of the infrastructure may be located on-premises or hosted in a network cloud by a service provider. The transaction method begins upon receipt by the service provider of an indication that one entity desires to connect to the other entity directly. The indication may be received as a result of a request-to-call (or "click-to-connect" or "CTC") received by the service provider via an application programming interface (API) exposed in a third party web page or mobile app. Typically, the transaction involves a potential sale of the commodity posted for sale on a third party site accessible via that page or mobile app. In this scenario, the third party is a customer that uses the telephony-based computing infrastructure. Upon receipt of the indication, in one embodiment the service provider initiates respective outbound connections from the IVR to each of the first and second entities. These outbound connections may be initiated at an agreed-upon time or during an agreed-upon time period.

Upon successful call connection to each of the respective entities, the service provider platform then bridges the outbound connections to enable the first and second entities to interact directly. As the first and second entities interact, and preferably with notice to the participants, the platform records the entire interaction between the first and second entities. By recording the interaction, the service provider facilitates entity privacy, at the very least because the recording provides after-the-fact documentation of what was said by each entity during the direct interaction. With permission, an individual call recording may be analyzed against one or more keywords and an indication provided that a participant in the call has violated (or potentially violated) an acceptable use policy of the third party site during the transaction. A corpus of recorded calls may also be used by the service provider to provide reports to its customers and to facilitate other advertising and marketing efforts. A recorded call may be archived and made available to authorized entities upon demand, and the recorded call information may be provided to one or both of the participants.

The foregoing has outlined some of the more pertinent features of the subject matter. These features should be construed to be merely illustrative. Many other beneficial results can be attained by applying the disclosed subject matter in a different manner or by modifying the subject matter as will be described.

By way of background, the following sections describe various enabling technologies upon which the techniques of this disclosure may be implemented.

Call (or more generally, "contact") centers are organizations or companies that represent one or more companies providing goods and/or services to a consumer base. Most state-of-art call centers are dual capable, meaning that they may handle both switched telephony calls and data network telephony (DNT) calls. A call center typically includes a plurality of workstations comprising computers connected to a local area network (LAN) or equivalent network. Each workstation includes or has associated therewith a telephone or equivalent for handling voice calls. Voice calls may also be handled directly in the LAN-connected computers using appropriate telephony software.

As is well-known, call centers are equipped generally to handle a wide range of interactions including live voice including voice over Internet protocol (VoIP), connection oriented switched telephony (COST) and messaging including email, instant messaging, and chat. Other forms of communication may also be supported like video conferencing, fax correspondence, and network-based applications for collaborating. Call center activity typically is recorded and made available for data mining, training, and other processes that rely on historical data for improvement of the performance of the center. Software adapted to report call center activity is typically part of a call center software suite.

FIG. 1 is an architectural overview of a known call center 103. A communications network is illustrated in this example and includes call center 103, a public switched telephone network (PSTN) 101, and a wide area network (WAN) 102. WAN 102 may be a corporate or private WAN including but not limiting to the Internet network. In this example, WAN 102 is an Internet network and may be referred to hereinafter in this specification as Internet 102. PSTN 101 may include wireless carriers and other telephony networks connected thereto by bridging and is meant to encompass any telephone network including digital and analog networks.

Call center 103 is dual capable, meaning that it may receive interactions from PSTN 101 and from Internet 102. Call center 102 has a local area network (LAN) 112 provided therein and adapted for transfer control protocol over Internet protocol (TCP/IP) among other known Internet protocols, not mentioned here but generally known to the skilled artisan. LAN 112 supports various personnel workstations as well as a host of nodes adapted to facilitate practice of the present invention. LAN 112 supports a plurality of agent workstations illustrated herein as agent workstations 113 (1-n). In this example, each agent workstation 113 (1-n) includes a LAN-connected personal computer (PC) and a telephone. Agents operating at stations 113 (1-n) are required to log into the call center system and may be located by the system using a directory server such as a directory server (DIR) 124 connected to LAN 112. LAN 112 preferably also supports at least one manager or supervisor workstation (MGR) 116. Workstation 116 also includes a LAN-connected PC and a telephone connected to PBX 109 by internal telephone wiring 110. Other equipment may be included within a workstation of an agent or manager.

In this example call center 103 has a centralized telephone switch 109 through which calls are received at the call center and placed from the call center (outbound). Switch 109 may be any type of call center switch including an automatic call distributor (ACD), a soft switch (implemented in software), or a private branch exchange (PBX). Switch 109 is a PBX in this example. Switch 109 in call center 103 has connection to a local network switch 107 by way of a telephone trunk 108. In this example the local network switch is also a PBX switch. Callers placing telephone calls into call center 103 or receiving telephone calls from call center 103 are illustrated herein as telephone icons 104 each telephone icon representing a potential customer of call center 103.

A customer station 105 is illustrated within PSTN 101 in this example. Customer station 105 has a telephone analogous to telephones 104 connected to local switch 107 via network telephone wiring. In one embodiment cellular telephones including smart telephones are used in place of landline telephones. Customer station 105 includes a personal computer illustrated herein as connected to the Internet network directly or through an Internet service provider (ISP not illustrated). Other more direct methods of Internet access are known in the art including digital subscriber line (DSL) technology, integrated digital services network (ISDN), broadband, wireless fidelity (WiFi), cable modem, etc.

All calls arriving at switch 109 in call center 103 are ultimately handled by the call center through live assistance from an agent or through the assistance of some automated system. PBX 109 is enhanced in this example by a computer telephony integrated (CTI) processor 114, also supporting an instance of interactive voice response (IVR) unit. Processor 114 is connected to switch 109 by a CTI link 117. Voice calls from Internet 102 and from sub-telephony networks connected to PSTN 101 may all arrive at switch 109 as incoming telephone voice calls. Agent telephones illustrated in agent stations 113 (1-n) are all connected by internal telephony wiring to PBX 109.

LAN 112 supports an Internet protocol router (IPR) 115 within call center 103. IPR 115 is adapted to provide direct Internet access to LAN 112 in a continuous manner such as on a 24/7 basis. IPR 115 enables bi-directional data and communication flow between call center agents and systems and resources including customers connected to the Internet network. IPR 115 has connection to Internet 102, more particularly to an Internet backbone illustrated herein as a double arrow extending through cloud 103. The illustrated backbone logically represents all of the lines, equipment and access points that make up the Internet as a whole. Therefore there are no geographic limitations.

A chat server (CHS) 121 is illustrated within the domain of Internet 102. CHS 121 has a digital medium accessible thereto for storing and serving data and for storing and executing applications enabling server function. CHS 121 is adapted to enable live chat sessions between agents from call center 103 and any potential customers having access to the network using a computing appliance capable of network navigation. One with skill in the art will recognize that a computing appliance capable of accessing Internet 102 may include but is not limited to a desktop computer, a laptop computer, a personal digital assistant or a smart cellular telephone.

A Web server (WS) 122 is illustrated within the domain of Internet 102. WS 122 has a digital medium accessible thereto for storing and serving data and for storing and executing applications enabling server function. Web server 122 is an electronic information server adapted to serve Web pages in hypertext transfer markup language (HTML) or another presentation protocol such as wireless application protocol (WAP). WS 122 may host one or more Web sites of one or more companies represented by call center 103. WS 122 may be thought of as a customer access point to call center 122. One or more call center applications may be implemented in Web services description language (WDSL) or other known application protocols generally known to the skilled artisan including the inventors. A Web page served by WS 122 to any potential customer may include various options for making contact to call center 103 including voice-based, and text-based interaction through call buttons, chat options, and messaging options.

Internet 102 has an email server (ES) 123 illustrated therein. ES 123 has a digital medium accessible thereto for storing and serving data and for storing and executing applications enabling server function. ES 123 is adapted to serve email to agents operating at agent workstations 113 (1-n) through IPR router 115. In one embodiment LAN 112 supports a general email router (EMR) 125. EMR 125 is a special email routing service for determining final internal routing to agents (over LAN 112) for emails sent to a generalized email address for the call center.

A universal routing server (URS) 111 is illustrated within call center 103 and connected to LAN 112. URS 111 has a digital medium accessible thereto for storing and serving data and for storing and executing applications enabling server function. URS 111 is adapted to serve internal routing strategies to requesting nodes over LAN 112. Initial routing strategy is typically invoked through a caller pre-screening process conducted using the IVR running on CTI processor 114. URS 111 may also be used to determine routing strategy in the case of a redirect or subsequent routing requirement as a result of interaction processing.

Voice calls registered at switch 109 may be intercepted by the IVR running on CTI processor 114 to determine the purpose of the call for the benefit of selecting an internal routing destination for the call. The call center includes a method for monitoring those calls that are routed to a live agent for the purpose of ensuring quality of the interaction and for gleaning information from the interaction in real time whereby that information is used in one or more analysis routines to provide additional data for historical reporting in one embodiment.

A historical reporting server (HRS) 118 is provided within call center 103 and connected to LAN 112. HRS 118 has a digital medium accessible thereto for storing and serving data and for storing and executing applications enabling server function. HRS 118 is adapted to record all call center activity and serving the information upon request in the form of specialized reports ordered from an interface such as a graphical user interface software (GUI SW) 127 illustrated on the computer of MGR station 116.

A call control media server (CCMS) 119 is provided within call center 103 and connected to LAN 112. CCMS 119 has a digital medium accessible thereto for storing and serving data and for storing and executing applications enabling server function. CCMS is integration between a call control server and a media-processing server. CCMS 119 is adapted to set up and tear down the call legs of a call and the media processor is adapted to process any associated media such as voice, video, and other media applications. In this example, HRS 118 and CCMS 119 are connected together via a separate digital network. CCMS is also connected directly to CTI processor 114 via the separate data network. A call center database (CCDB) 120 is provided and is made accessible to CCMS 119 and to HRS 118. Monitoring occurs within CCMS of all of the interactions represented therein. In one embodiment, CCMS records all data to CCDB 120 and HRS 118 serves all requested data from CCDB 120.

In one embodiment, information detected during an interaction whether the interaction is voice-based or text-based is stored with all of the traditional historical information related to the interaction and interaction initiator (customer). A manager operating GUI SW 127 from MGR station 116 can order and receive specialized historical reports that exhibit what topics the customers are talking about. The information may be presented in any number of customized reports that can include information about just a single interaction to statistics relative to some of or all of the interactions that occurred and were monitored by CCMS 119.

Calls received at PBX 109 for internal routing are setup by CCMS 119 in this example after CTI notification of calls pending. CCMS may utilize IVR records of the calls to determine with the aid of URS 111 the best routing strategies for the calls being set up in the system. URS returns the routing strategy for each call based on information sent to it in the request from CCMS 119, which includes IVR records of the pre-screening process. URS 111 may also subscribe to call center statistics on agent availability, estimated wait time (EWT) in queue, and other states before returning a viable routing strategy for each call pending. Manual routing and redirection may also be practiced by agents and supervisors logged into the system in place of or in addition to URS participation.

The call center provides a click-to-call (CTC) capability. CTC is sometimes referred to a "request-to-call." As is well-known, CTC provides a way (e.g., a web-based dialog) for an end user to request an interaction with a customer service representative (CSR). CTC as a service may be provided from the call center platform shown in FIG. 1. In use, the end user enters his or her phone number, after which the call center (or, more generally, some intermediary service) calls both that end user and a third party, and connects the two together for an ordinary telephone conversation. A click-to-chat capability is similar, except that the user selects a link to open up a chat dialog, typically within or in association with the web page that the end user is currently viewing. Typically, the cost for CTC (or click-to-chat) is paid by the website operator.

Hosted Outbound Calling Platform

In some instances, the call center such as described above also provides for a hosted computer telephony platform by which business entities (customers) may provision telephony-based communication services, such as automated outbound campaigns that afford target recipients an opportunity to be connected to the call center for some further action. An example of an interactive communications campaign is a telephone campaign to determine whether a target recipient desires to transfer a credit card balance to a new account, a campaign to remind a recipient that a credit card payment is due and to offer the recipient an opportunity to speak with a customer representative concerning any payment issues, or the like. The hosted solution typically is implemented as an application (or "managed") service provider. One or more business entities ("clients") that desire to use the service typically register and access the service through an on-line (e.g., web-based) portal. In one representative use scenario, the managed service provider entity provides outbound telemarketing services on behalf of participating clients. The campaign typically is provisioned by the client. Thus, for example, using a web-based interface, a participating client defines a script for the campaign, imports a set of contacts (typically, the client's actual customers), and defines one or more parameters that govern how the campaign is to be run. At a designated time, the service provider initiates the campaign, e.g., by providing the contacts to a set of telephone servers that set-up and manage the telephone calls to the targets of the campaign. During a given outbound call, as noted above, a recipient (a "customer") may be afforded an option to connect to a contact center, e.g., to speak to a customer representative. In such implementations, the hosted solution typically is integrated directly with the contact center's on-premises automatic call distributor (ACD).

The operation of the hosted platform in this context is described with reference to FIGS. 2A-2B. In this model, a business entity connects to the service provider, authenticates, and then uses one or more applications to create, execute and manage an outbound campaign. These applications execute on the application server machines and operate in association with one or more databases that are supported within the database management system. These applications include, for example, a contact management application 202, a campaign management engine 204, a scheduling engine 206, and a scripting engine 208. The contact management application 202 handles the receipt and storage of the contact list(s) uploaded (e.g., via FTP or otherwise) to the system by or on behalf of the business entity client. The scripting engine 208 handles the creation and managing of the campaign scripts, using instructions entered by or on behalf of the business entity client via a web-based interface or Web services API. The campaign management engine 204 manages the campaign by interoperating with the scheduling engine 206, which in turn interoperates with the telephony servers 205 to execute the campaign. The business entity client evaluates or monitors the campaign from summary, detail and/or custom reports generated by a reporting engine application 210. Campaign evaluation and monitoring may also be performed via a Web-based user interface, or in an automated manner via an API. Notification campaigns are executed using email servers 212 and SMS (or MMS) servers 214, or by other means, such as by telephone.

Figure 2A:
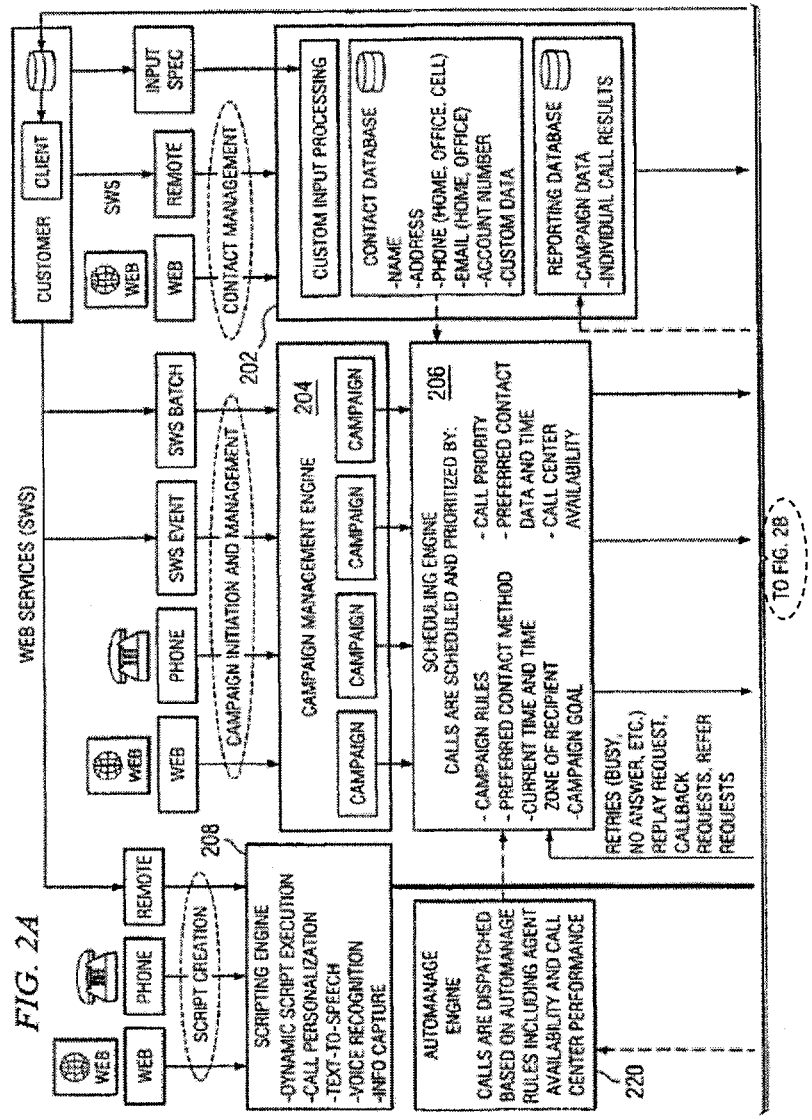
FIGS. 2A-2B illustrates a hosted outbound platform that may be used to facilitate the intelligent connection service according to one embodiment of the invention.
Figure 2B:
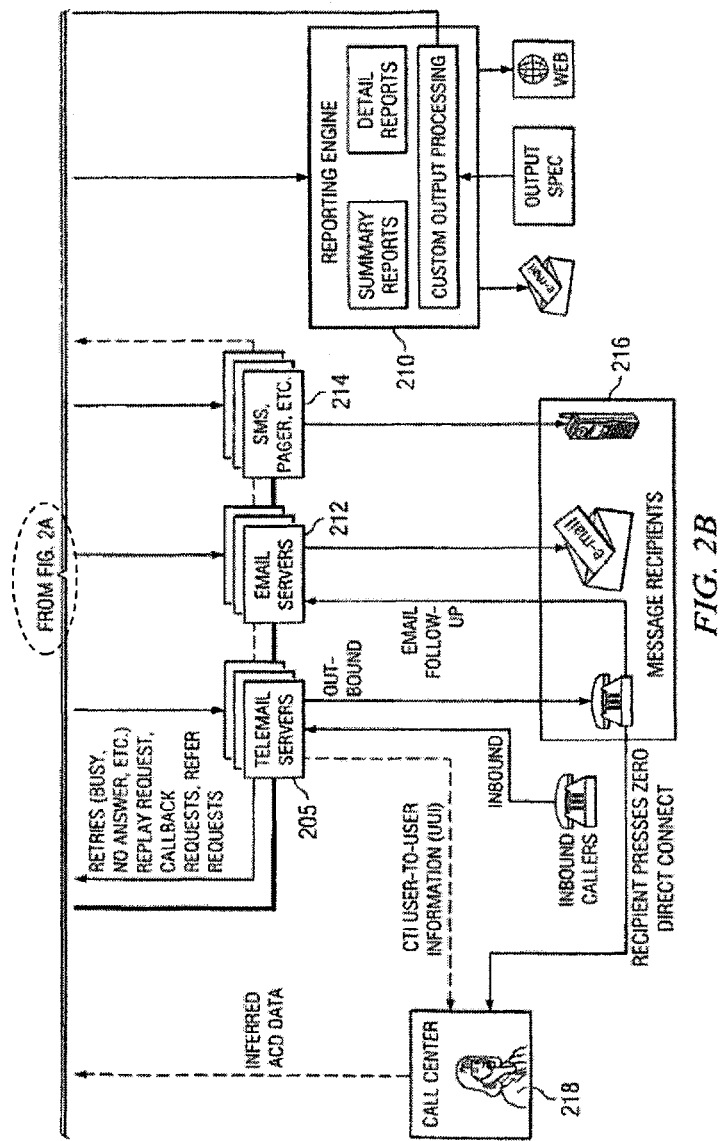

As also illustrated in FIGS. 2A-2B, after connecting an outbound call to a target customer 216, the customer may elect to be connected to the contact center 218 (typically a third party contact center) or the system may perform that direct connect automatically once it determines that a human being (as opposed to an answering machine) has answered the outbound call. The system typically obtains information about the contact center's performance during a given communications campaign, commonly without requiring a direct connection between the infrastructure and a contact center's on-premises ACD. This enables the managed service provider to integrate with both its business entity clients and with their associated contact center environments rapidly and efficiently. The interconnectivity between the managed service provider and the contact center may be "inferred" from how calls that originate from the service provider to the target recipients (who have expressed an interest in being connected to the contact center) are actually handled. This "indirect" connectivity is illustrated in FIG. 2A by the control engine 220, which can be provided in software as a set of software instructions executable on a processor. The engine is responsible for dispatching messages at an appropriate rate while ensuring that all customer-requested rule parameters are honored. Examples of such parameters include: number of agents available at the contact center, maximum hold time at the contact center, client abandon rate prior to speaking to a contact center, number of bad numbers reached on the outbound dial, and so forth. Generally, for a given client campaign or sub-campaign, the engine 220 decides on an initial message dispatch rate based on the client-requested parameters (and, optionally, on historical data from like campaigns or sub-campaigns). Once the campaign or sub-campaign, as the case may be, starts running, the engine 220 monitors the parameters and ensures that they remain within tolerance. If an identified parameter exceeds the client-defined value, then a system action rule (e.g., adjusting the message dispatch rate, suspending the sub-campaign, or the like) is applied and any client notification requested is issued.

The hosted service may also provide a campaign strategy management (CSM) module. Preferably, a service customer accesses CSM functionality through a web-based graphical user interface (GUI), via a programmatic interface, or otherwise. The CSM component allows customers to define more granular and specific campaign strategies, including pass escalation for alternative channels (e.g., text and email) and/or based upon attempt results, contact attributes and response group data. The campaign strategy manager allows users to define pass escalation strategies statically and dynamically, to manage lists across multiple campaigns, and to view results in real-time. A defined strategy is a static strategy created by a user for a particular campaign that, once created, typically is not modified. A dynamic strategy is one where, during the course of a day (e.g., as a sub-campaign is running), a user may alter the defined strategy, preferably just for that day (or portion thereof).

Other Computing and Access Technologies

One or more functions of a technology platform such as described above may be implemented in a "cloud-based" architecture. Cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications). A cloud-based platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, networking technologies, etc., that together provide the functionality of a given system or subsystem. As described, the functionality may be implemented in a standalone machine, or across a distributed set of machines.

As noted above, the front-end of the above-described infrastructure is also representative of a conventional web site (e.g., a set of one or more pages formatted according to a markup language).

Client devices access service provider infrastructure as described to retrieve content, including HTML, media players, video content, and other objects. A typical client device is a personal computer, laptop, mobile device, tablet, or the like. A representative mobile device is an Apple iPad® or iPad2, iPad Mini, an Android™-based smartphone or tablet, a Windows®-based smartphone or tablet, or the like. A device of this type typically comprises a CPU (central processing unit), such as any Intel- or AMD-based chip, computer memory 304, such as RAM, and a flash drive. The device software includes an operating system (e.g., Apple iOS, Google® Android™, or the like), and generic support applications and utilities. The device may also include a graphics processing unit (GPU), and a touch-sensing device or interface configured to receive input from a user's touch. The touch-sensing device typically is a touch screen. The mobile device comprises suitable programming to facilitate gesture-based control, in a manner that is known in the art. The client is not limited to a mobile device, as it may be a conventional desktop, laptop or other Internet-accessible machine running a web browser (e.g., Internet Explorer (6 or higher), FireFox (1.5 or higher), Safari (3 or higher), or the like. Content retrieved to the client may be rendered in a browser, within a mobile app, or other rendering engine.

Intelligent Connection of Buyer and Seller with Privacy Protection, and Interaction Recording With the above as background, the techniques of this disclosure are now described. As noted above, this disclosure provides an "intelligent connection" method, preferably via a telephony-based, services platform, which enables prospective buyers and sellers (or, more generally, "entities") to interact concerning a possible transaction but preferably without exposure of sufficient identifying information that otherwise disintermediates the service provider from participating in the transaction. As used herein, an "entity" is any person (or a machine or computing entity acting on behalf of that person either automatically or programmatically) and that desires to obtain a commodity. A "commodity" (or "item") is any product or service, or combination thereof. First and second entities herein typically correspond to a prospective buyer of a commodity that is being offered by a prospective seller of that commodity. The commodity typically is advertised as available from a network-accessible location, typically a web site or web app. In the context of this disclosure, it is assumed that entities use client devices such as described to access network-accessible services to learn about the potential sale of the commodity. The term "sale" is not intended to be limiting, as the nature of the transaction details of course may vary and include barter or other economic arrangements. A typical implementation thus is a web site, and that web site may be hosted in a third party infrastructure such as described above. A third party service provider operating the services platform as described above then provides the techniques of this disclosure to facilitate the transaction. As illustrated in FIG. 1, the telephony-based computing infrastructure includes an interactive voice response unit (IVR) function. All or part of the infrastructure may be located on-premises or hosted in a network cloud by a service provider.

Figure 3:
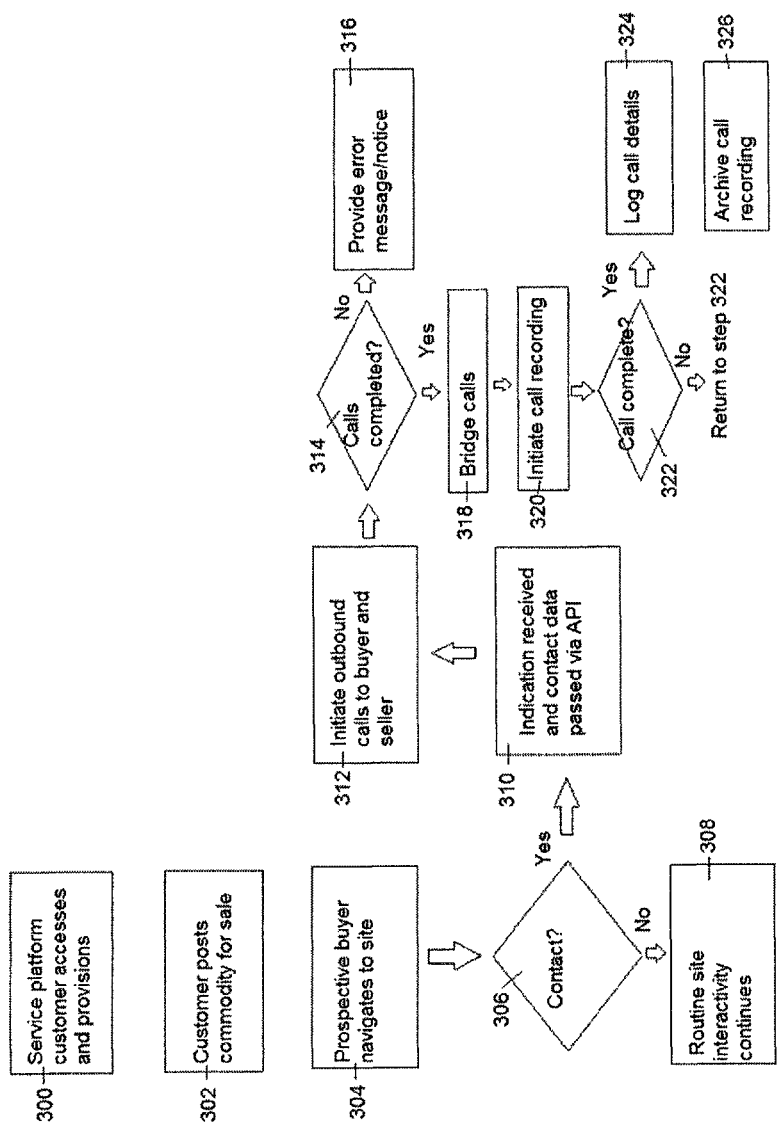
FIG. 3 is a flow diagram of a process for connecting transaction entities to one another with interaction recording according to one embodiment of the invention.

FIG. 3 is a flow diagram of a process for connecting transaction entities to one another with interaction recording according to one embodiment of the invention. The process may be described in terms of a software routine executed by a processor (e.g. processor of a web server which may be similar to web server 122 of FIG. 1), based on instructions stored in the server's memory. The instructions may also be stored in other non-transient computer readable media such as, for example, a CD-ROM, flash drive, or the like. A person of skill in the art should also recognize that the routine may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art.

The process starts, and a services platform customer accesses the platform and provisions the capability. In this regard, the processor receives and processes commands from the services platform customer for provisioning the capability. For example, the processor may insert suitable code on the customer's web page, such as, for example, code that causes display of an icon, button, or other option that may be selected by a first transaction entity to be connected privately to a second transaction entity. In a typical use case, the customer is a web site that offers a marketplace by which sellers post commodities for sale, and to which buyers can access to purchase such commodities. A "web site" should be broadly construed to cover a conventional web site accessible via a web browser, a web application accessible via a dedicated web app, an application server accessible via a front-end web service, or the like. Typically, the web site includes a CTC or similar type of capability, and the services platform as described above may be used to facilitate these computer-telephony based integrations. During provisioning, the customer accesses the platform, typically through a web-based interface (as described above with respect to FIGS. 2A-2B), and configures its site pages to use the intelligent connection service of this disclosure. According to one embodiment, this provisioning provides an application programming interface (API) into the telephony platform. Once configured, suitable code (e.g., HTML) is then supported in the client's transaction web page. The code exposes a link or other navigation element on the third party page. Thus, the link might advertise to a buyer that he or she should "Click here to speak to the seller privately" or the like. Using the provisioning operation, the web site configures its pages (or the site, in general) to use the intelligent connection service. Typically, the services platform provider charges for the service, e.g., on a price-per-call basis, on a revenue-sharing basis, or the like.

At step 302, the web site posts the commodity for sale in the marketplace. This is a representative use case, but it should not be taken to limit this disclosure, as the particular manner in which the buyer and seller come together for a potential interaction is outside the scope of this disclosure. Typically, the web site provides tools to enable sellers to navigate to the site and post items for sale in the marketplace. At step 304, a prospective buyer navigates to the site and expresses an interest in an item being offering for sale (or other exchange) by the seller. A test is then carried out at step 306 to determine whether the prospective buyer desires to interact with the seller directly through the intelligent connection function. If not, the routine continues at step 308 with routine site interactivity (e.g., the buyer selecting the item for sale and closing the transaction, the prospective buyer navigating to another item or off the page, etc.). If, however, the outcome of the test at step 306 indicates that the buyer desires to interact with the prospective seller directly, the routine continues at step 310. At this step, an indication is received (at the services platform) from the site requesting an interaction between buyer and the seller. As explained, typically this interaction is received via the API exposed in the third party web page or web application. Through the API, the site also provides the services platform with information about how to contact each of the buyer and seller. Typically, this contact information has been (or can be) collected at the site directly from the respective buyer and seller. The contact information may be provided to the services platform out-of-band by the site if available, provided the site provides notice to its users that the site intends to share such information (e.g., to facilitate site services such as the intelligent connection service of this disclosure). At step 312, the services platform initiates outbound calls to each of the buyer and seller, e.g., using an IVR such as shown in FIG. 1 or an outbound calling service such as described in FIGS. 2A-2B. A test is then performed at step 314 to determine whether both buyer and seller entities have been reached by the services platform. If the outcome of the test at step 314 is negative, the routine continues. After a suitable time-out, an error message may be provided to the prospective buyer (via the API) that the call to the seller cannot be established. This is step 316. When the outcome of the test at step 314 indicates that both buyer and seller have been reached by the services platform, the routine continues at step 318.

During the call set-up process, a party (or the service provider) may provide available times for the interaction. Thus, in one embodiment, a party provides information identifying a time (or time period) during which the party can be reached, and that information is then provided to the other party. In an alternative, the service provider provides the parties with one or more options for selecting available times and/or provides a mechanism by which the parties can select an agreed-upon time. In yet another alternative, a party may provide such information in an off-line manner (e.g., during a registration) or otherwise. If the interaction between buyer and seller will occur at some future agreed-upon (or system-configured) time or time period, the system may issue each participant a notification to that effect. The service provider also may use text messaging or other means to interact with a party to determine the times for the anticipated interaction.

Upon successful call connection to both parties (either then or, as agreed, at the later time), the service provider platform then bridges the outbound connections to enable the first and second entities to interact directly. This is step 318. At step 320, and after the respective calls are bridged by the services platform, the platform initiates a call recording function. As the first and second entities interact, and preferably with notice to the participants, the platform records the entire interaction between the first and second entities. By recording the interaction, the service provider facilitates respect for entity privacy, at the very least because the recording provides after-the-fact documentation of what was said by each entity during the direct interaction. At step 322, a test is performed to determine whether the direct buyer-seller interaction has ended. If not, the routine cycles. When the outcome of the test at step 322 indicates that the call is terminated, the routine continues with the service provider logging the call details at step 324. At step 326, the call recording preferably is archived, perhaps after being converted to a digital format (if not already in that format). The recording is maintained as needed to ensure that the participants have honored the site terms of use or other policies that provide for direct communications.

Following completion of the interaction, the recording also may be provided to the first and second entities, or either one of them. Preferably, the recording is saved (archived) on the platform and is thereafter made available, perhaps on-demand, on a permission basis, to the participants or other authorized persons or entities.

Because the information collected during a recording may be sensitive, typically the buyer and seller should be notified in advance (e.g., perhaps just after the call setup is complete and the parties are bridged together) that the call is being recorded. In one embodiment, and as configured by the site, upon completion a call recording is converted to digital form and mined for one or more keywords, the presence of which may indicate that one of the buyer or seller exchanged with one another personally identifying information (PII) such as names, telephone numbers, street addresses, email addresses, other aliases, or the like. As noted above, it is assumed that the exchange of such information may indicate a potential violation of a site's terms of use, e.g., because the exchange may enable the parties to interact with one another directly in a way that is not permissible by the site's terms of use or other policies. Recording interactions and mining them for keywords thus helps protect the site from lost business or business opportunities. Preferably, the services provider platform provides this added value as part of the intelligent connection service.

Individual sites can access the service provider platform and provision the intelligent connection "as-a-service" on demand and as required. Because the platform provides a generic and easy-to-use way to provision the service, it may be used by many different types of marketplaces, irrespective of the nature of the goods and services being offered or the different types of site terms of use that may be enforced on those sites. The approach provides a secure and private way in which buyers and sellers can connect to one another but without at the same time doing so in a way that undermines the site's involvement in the transaction. With permission, the service provider records transaction calls to protect the principals and consumers.

By recording the interaction, the service provider facilitates respect for entity privacy, at the very least because the recording provides after-the-fact documentation of what was said by each entity during the direct interaction. A corpus of recorded calls may also be used by the service provider to provide reports to its customers and to facilitate other advertising and marketing efforts. The intelligent connect service may be provisioned for a particular transaction, or transaction type, or for a set of transactions that originate from the intermediary (the service provider platform's customer).

A customer's interaction with the service provider platform (e.g., for provisioning, receipt of notifications, other reporting) preferably is done securely through SSL or other such mechanisms. Given the sensitive nature of the information in the call recordings, preferably only authenticated and authorized persons associated with the customer are permitted to access the services platform. Role-based or other access control mechanisms may be used for this purpose.

Recorded call information also may be data mined to facilitate process and general business improvements for participating entities including, without limitation, the provider of the site (upon which the interaction is initiated) and the participants, as well as for the applications and systems by which the participants interact.

Figure 4:
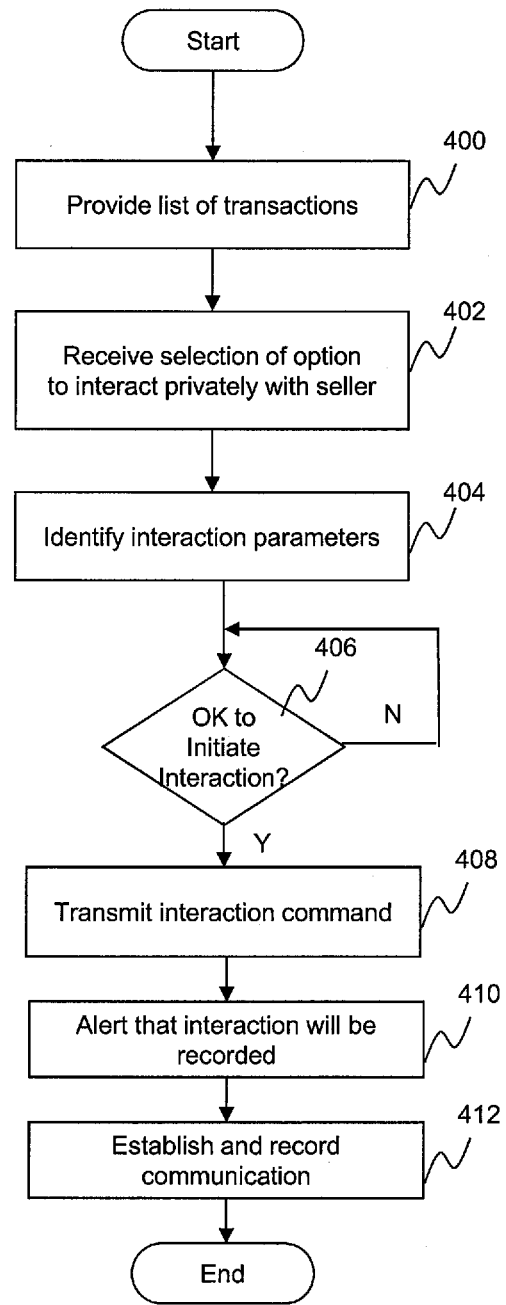
FIG. 4 is a flow diagram of a process for connecting transaction entities to one another with interaction recording according to another embodiment of the invention.

FIG. 4 is a flow diagram of a process for connecting transaction entities to one another with interaction recording according to one embodiment of the invention. The process may be described in terms of a software routine executed by a processor (e.g. processor of a web server which may be similar to web server 122 of FIG. 1), based on instructions stored in the server's memory. The instructions may also be stored in other non-transient computer readable media such as, for example, a CD-ROM, flash drive, or the like. A person of skill in the art should also recognize that the routine may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art.

The process starts, and in step 400 the web server provides a list of transactions posted by, for example, different selling entities, for display on a requesting end user device. For example, the transactions may be displayed upon accessing, via a web browser, a web page provided by the web server. The transactions may also be displayed via a dedicated application downloaded on the end user device. According to one embodiment, the transactions provided for display are associated with one or more categories of goods and/or services, such as, for example, sale of used cars, vacation rentals, provision of babysitting services, and the like. This allows a potential transacting entity to narrow the list of transactions based on desired categories.

According to one embodiment, each transaction is displayed along with an option that the potential buyer may select if he or she wants to engage in a private interaction with the selling entity who posted the transaction. The option may be displayed next to each transaction in the form of a button, hyperlink, icon, or the like. The potential buyer may want to contact the selling entity to gather information on the displayed transaction that is not available on the web page. For example, if the transaction is the sale of a particular type of used car, and the particular type of car is known for having, for example, rust problems, the potential buyer may ask the seller to provide a picture of certain parts of the car that are susceptible to rust. As another example, if the transaction is rental of a vacation home, people may want to ask the location of the rental relative to special landmarks.

In step 402, the web server receives selection of the option to request interaction with the selling entity. According to one embodiment, a buyer is prompted to log into the web server in order to request private interaction with the seller. In some embodiments, the buyer may have to log-in to even view the posted transactions. According to one embodiment, the end user device bundles the user's login information (e.g. the user ID) along with the request for interaction, which, for example, includes a transaction ID, and transmits the bundled request to the web server. In another embodiment, the potential buyer is not required to log-in, but is prompted to provide his or her contact information if he or she desires to invoke the option to interact privately with the seller. As a person of skill in the art should appreciate, the interaction can be initiated without disclosing personal contact information of the buyer and seller to each other.

In step 404, the web server receives the bundled request and determines the interaction parameters in response to the request. This may entail, for example, identifying the seller entity based on, for example, the transaction ID, and retrieving preference information stored for the selling entity. Such preference information may include, for example, preferred times at which the seller wants to be contacted, preferred media channels (e.g. most preferred is telephone followed by text), preferred contact information (e.g. mobile phone number is most preferred followed by home phone number), and the like. The seller preference information may be general for all or a subset of transactions. The seller preference information may also be customized on a transaction-by-transaction basis.

In step 406, a determination is made as to whether an interaction may be immediately started with the selling entity per the seller's preferences.

If the answer is YES, the web server transmits, in step 408 a command to the appropriate server to establish the requested interaction between the buying and selling entities. For example, if the interaction to be established is a telephony interaction, the web server transmits to, for example, a SIP (Session Initiation Protocol) server/media server (not shown), campaign management engine 204, and/or the like, a SIP message to establish a telephony call between the buyer and seller entities. The SIP server may be coupled to, for example the IPR 115 of FIG. 1. If the interaction to be established is, for example, a chat session, the web server transmits the command to the chat server 121. Of course, other types of interactions via other communication channels are also possible, such as, for example, text, email, and/or the like.

In step 410, the web server transmits an alert that the interaction will be recorded. The alert may be an audio alert, visual alert, or a combination of both.

In step 420, communication links are established between the buyer and seller entities. The entities exchange desired information via the communication links which is recorded and stored in a data storage device. In this regard, if the communication is a voice-over-IP telephony call, the SIP server establishes the communication links with the buyer and seller entities by transmitting interaction requests to the buyer and seller entities (more specifically, to end user devices operated by the buyer and seller entities). Upon acceptance of each of the requests, a connection is established between the buyer and seller entities. According to one embodiment, actual media exchanged between the buyer and seller entities via the communication links is bridged by a media server. In this regard, the communication flows through the media server and the media server records the communication exchanged between the buyer and seller entities by replicating the exchanged media and storing the replicated media in the storage device in association with the buyer, seller, and/or transaction. According to one embodiment, a copy of the recorded interaction is provided to the buyer and/or seller upon, for example, request from the buyer and/or seller. A copy may also be maintained in a data storage device for purposes of, for example, conflict resolution between the buyer and the seller. For example, the recording may serve as evidence of representations made by the communicating parties in the event that those representations are disputed.

Referring again to step 406, if an interaction is not appropriate at the time of the request by the buyer, the web server may, according to one embodiment, transmit a notification to the buyer entity that the interaction could not be completed, and provide reasons for not completing the interaction. The web server may also provide, to the buyer entity, the conditions under which the seller would prefer to be contacted (e.g. seller's preferred times for contact). The preference information may be shared before or after a request for private communication. According to one embodiment, the buyer may manually initiate (or re-initiate) the contact when the conditions are appropriate, or the web server may automatically monitor the conditions and initiate (or re-initiate) the interaction when such conditions are appropriate. In the latter embodiment, the web server may provide an alert to the buyer that conditions are appropriate to initiate the contact, and provide the buyer the option to cancel the request if, for example, it is not appropriate for the buyer to engage in the interaction at that time.

According to one embodiment, after information is exchanged between the buyer and the seller, the transaction is completed via conventional mechanism provided by the web server. For example, the buyer may select a "Buy" option provided on the web page next to the transaction item to take steps to close the transaction.

Figure 5:
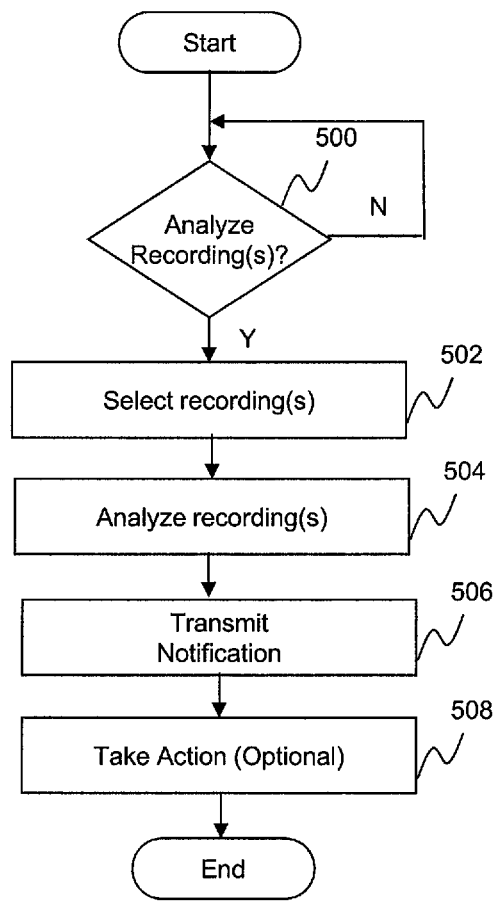
FIG. 5 is a flow diagram of a process for analyzing recordings and generating outputs according to one embodiment of the invention.

FIG. 5 is a flow diagram of a process for analyzing recordings and generating outputs according to one embodiment of the invention. The process may be described in terms of a software routine executed by a processor based on instructions stored in the server's memory. The instructions may also be stored in other non-transient computer readable media such as, for example, a CD-ROM, flash drive, or the like. A person of skill in the art should also recognize that the routine may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art.

The process starts, and in step 500 the processor, hereinafter referred to as an analytics server (not shown), determines whether one or more recorded interactions are to be analyzed. In this regard, the analytics server determines whether a trigger event has been detected, such as, for example, receipt of a user command to initiate the analysis, elapse of a particular time period since a last analysis, start of a preset analysis time, end of an interaction to which the recording relates, and/or the like.

If the answer is YES, the analytics server selects one or more recordings to be analyzed. The specific recording(s) to be analyzed may be specified by a user. For example, the user may select for analysis, recordings that satisfy a particular criteria, such as, for example, a recording associated with a particular transaction, recordings involving a particular interaction party, recordings involving a category of transactions, recordings made during a particular time period, and/or the like. The analytics server may also be configured to automatically select one or more recordings for analysis. For example, the analytics server may be configured to automatically identify and select recorded interactions that require analysis.

In step 504, the analytics server engages in analysis of the selected recordings. This may entail, for example, invoking a speech recognition system and method for recognizing utterances made during a conversation as disclosed in U.S. patent application Ser. No. 13/886,205, filed on May 2, 2013, entitled "Fast Out-of-Vocabulary Search in LVCSR and ASR Systems," the content of which is incorporated herein by reference. Of course, any other speech recognition system and method conventional in the art may also be used.

According to one embodiment, the recordings may be analyzed to determine whether an interaction rule was violated. One such interaction rule may be that no personally identifiable information be exchanged during the interaction. Personally identifiable information may include telephone numbers, email addresses, and the like, used for general communication by the disclosing party including communication unrelated to the particular transaction.

The recordings may also be analyzed to determine a trend or to gain some other knowledge as to the reason for the private interactions, a trend in the type of information exchanged during the private interactions, and the like. For example, analysis of recordings associated with sales of a particular car model may uncover that there is a tendency or trend to ask about rust problems. As another example, analysis of recordings associated with used piano sales may uncover that there is a tendency or trend to ask about the place in which the piano was manufactured and/or used to determine whether the piano is fit for the climate where a potential buyer resides. In yet another example, analysis of recordings relating to rentals in a particular geographic location (e.g. Cozumel, Mexico) may reveal a tendency or trend for people to ask about the distance of the rental to a special landmark (e.g. special beach) that is famous in that location.

Whether the analysis is to detect trend, violation of an interaction rule, or otherwise, the analytics server may be configured to compare recognized utterances from one or more recordings, against a preset list of keywords and/or phrases, to determine whether the keywords and/or phrases were uttered during the conversation. For example, in order to detect whether personal identifiable information was shared, the list of keywords may include words such as, "telephone number," "email address," and the like. According to one embodiment, a portion of the recording in which the particular utterances were made is marked. A frequency in which the keywords are uttered may also be monitored for determining trend.

In step 506, a notification is transmitted to the communicating parties and/or other party (e.g. an administrator) in response to the analysis. For example, the notification may be to warn the communicating parties of the violation of interaction rules. Additional notification may be provided to prompt an administrator to re-train an agent involved in the communication and/or to scrub the recordings of information violating the interaction rules. According to one embodiment, the notification may be to prompt an administrator to make a modification relating to future transactions associated with a particular category of transactions based on a detected trend. A trend may be detected, for example, if the frequency at which a particular keyword or phrase appears is above a preset threshold.

In step 508, an action may be optionally taken in response to the notification. In the example of communicating parties violating an interaction rule, a count of such incidents may be updated and stored in association with the violating parties. When the count is above a particular threshold, other actions may be taken, such as, for example, preventing a violating party to engage in private interactions in the future. Other actions may include traversing to the marked areas of the recordings and scrubbing information violating the interaction rules. The action may also be to schedule a re-training seminar for a violating agent.

In the example where a trend is detected, the action may be to modify information that is solicited from future sellers for a particular category of transactions. In the example of potential buyers asking about rust when the transaction involves particular types of cars or particular geographic regions, an additional prompt may be provided to future sellers of cars in this category to include a picture of the undercarriage of the car, and upload the picture on the web site along with other information on the car. In the example of potential renters asking about distance from special landmarks, an additional prompt may be provided to future renters in this area to include the distance to such landmarks on the web page. This helps reduce the need for private interactions, expedites closing of transactions, and helps drive up sales.

Each of the various servers, controllers, switches, gateways, engines, and/or modules (collectively referred to as servers) in the afore-described figures may be a process or thread, running on one or more processors, in one or more computing devices 1500 (e.g., FIG. 6A, FIG. 6B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 6A:
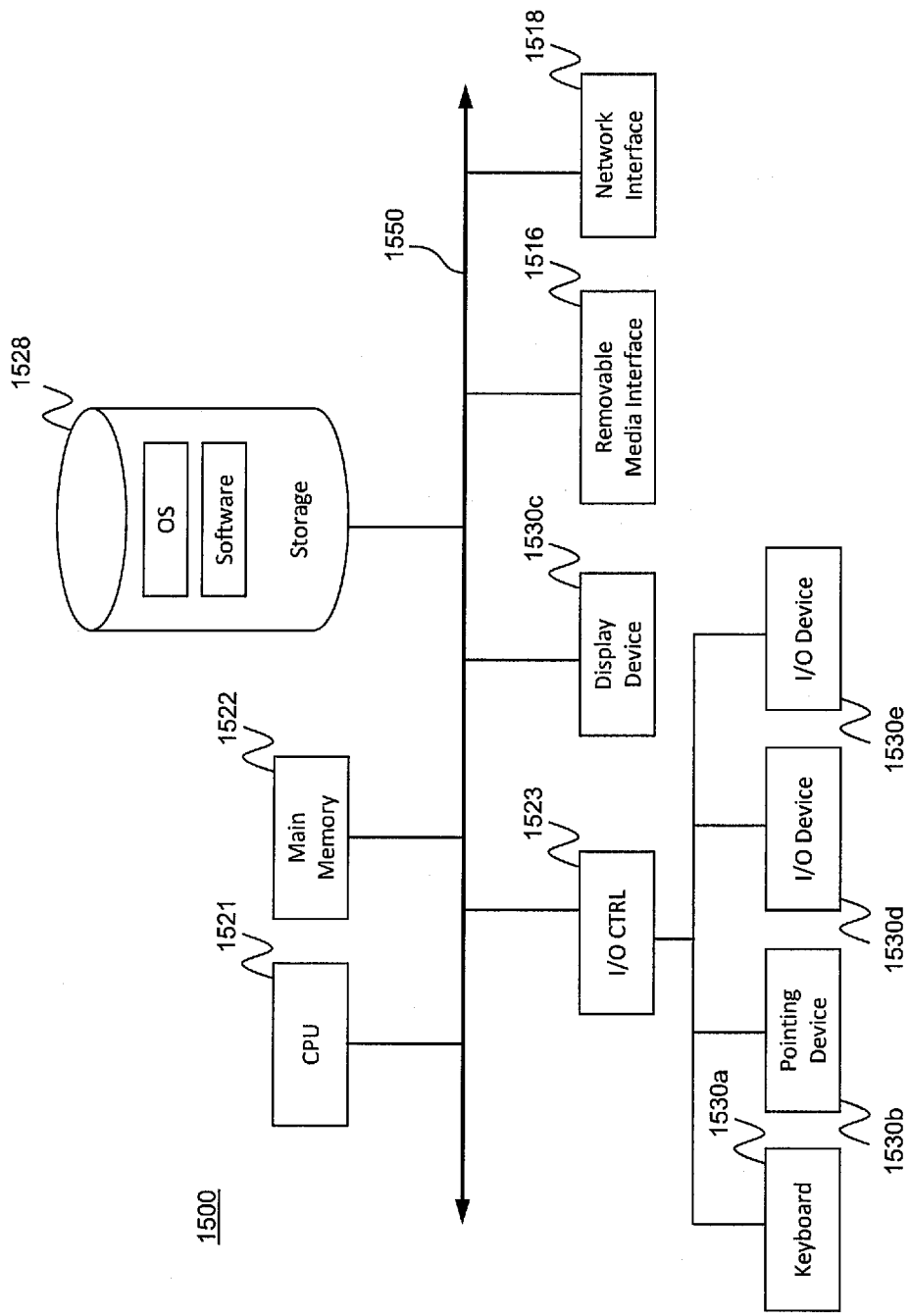
FIG. 6A is a block diagram of a computing device according to an embodiment of the present invention.
Figure 6B:
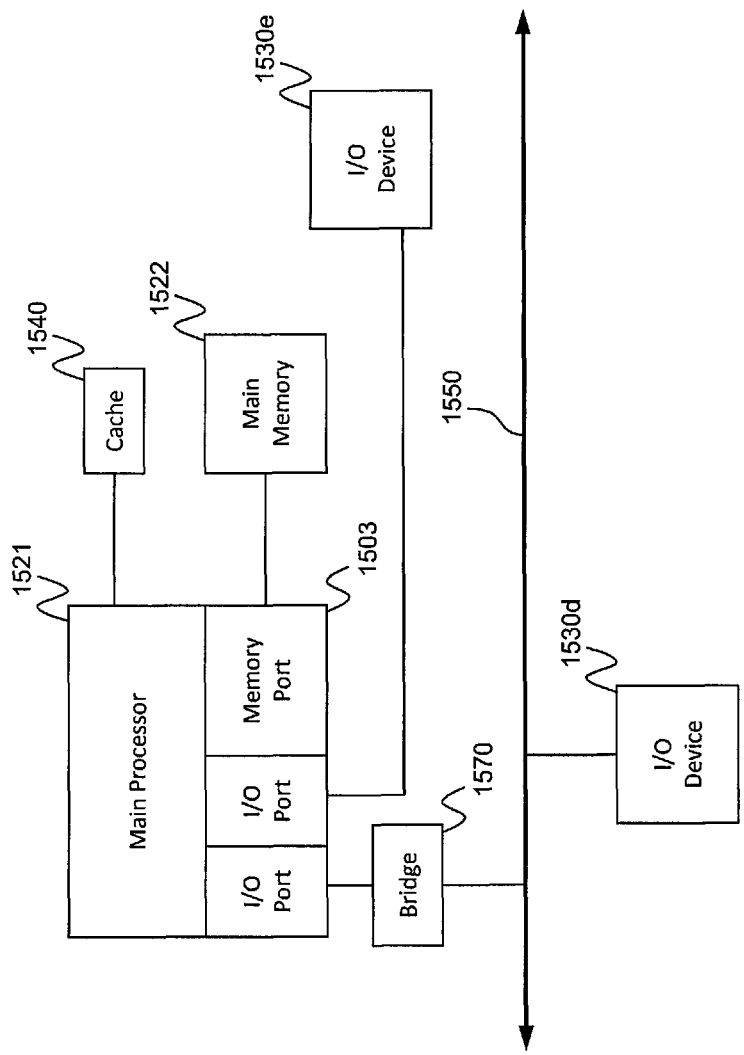
FIG. 6B is a block diagram of a computing device according to an embodiment of the present invention.

FIG. 6A and FIG. 6B depict block diagrams of a computing device 1500 as may be employed in exemplary embodiments of the present invention. Each computing device 1500 includes a central processing unit 1521 and a main memory unit 1522. As shown in FIG. 6A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 6B, each computing device 1500 may also include additional optional elements, such as a memory port 1503, a bridge 1570, one or more additional input/output devices 1530d, 1530e and a cache memory 1540 in communication with the central processing unit

1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 6A, the central processing unit 1521 communicates with the main memory 1522 via a system bus 1550. As shown in FIG. 6B, the central processing unit 1521 may also communicate directly with the main memory 1522 via a memory port 1503.

FIG. 6B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 6A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 6B depicts an embodiment of a computer 1500 in which the central processing unit 1521 communicates directly with I/O device 1530e. FIG. 6B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 6A, may control the I/O devices. The I/O controller may control one or more I/O devices such as a keyboard 1530a and a pointing device 1530b, e.g., a mouse or optical pen.

Referring again to FIG. 6A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 6A and FIG. 6B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 6D:
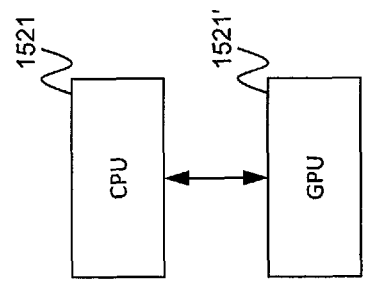
FIG. 6D is a block diagram of a computing device according to an embodiment of the present invention.
Figure 6C:
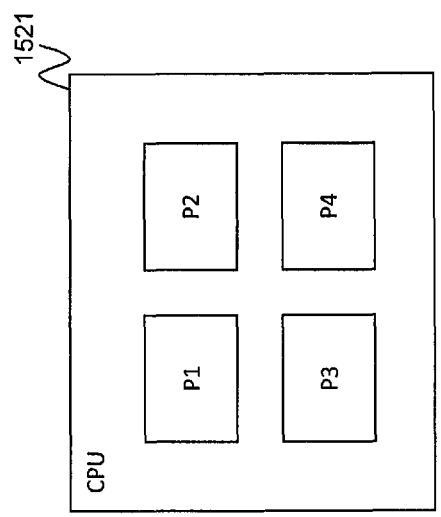
FIG. 6C is a block diagram of a computing device according to an embodiment of the present invention.

As shown in FIG. 6C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 6D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 6E:
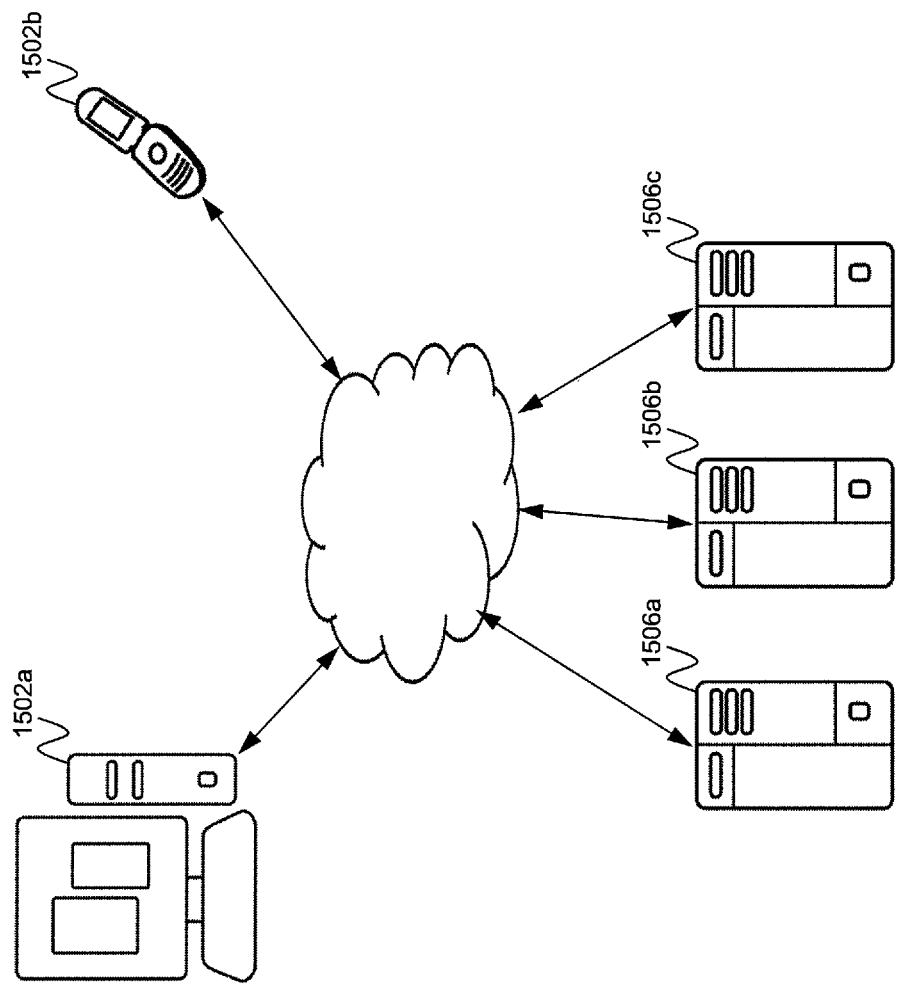
FIG. 6E is a block diagram of a network environment including several computing devices according to an embodiment of the present invention.

A computing device may be one of a plurality of machines connected by a network, or it may comprise a plurality of machines so connected. FIG. 6E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 6E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 6E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hype/visor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

While the above-described technique is described in the context of connecting transaction entities, this is not a limitation. There may be other use cases where it is desired to connect entities to one another securely and privately, with interaction recording. One such example, might involve business process outsourcing, where (for example) a US company is relying on individuals located abroad to provide various services. An example scenario might involve a commercial entity (such as a bank or other financial institution) that uses a processing entity and its local agents in India to process certain transactions (such as fraud detection for checks). In such cases, the foreign processing agent typically does not need to know the full identity of the person for whom the fraud check is being performed, as such knowledge could violate regulations and/or put the impacted person at further risk of identity theft. That said, there might be situations where the foreign agent actually needs to talk to the given person. In this case, the techniques herein may be used, with the service provider or the primary contact center of the business (e.g., the bank in the US) acting as a moderator to establish and monitor the contact. Both sides would be instructed to limit the interaction as appropriate to preserve privacy and confidentiality, and the interaction would be recorded. The recording would be evaluated for compliance; if the recording indicates that personally identifiable information (PIT) or the like were exposed by the agent's questions or conduct, the recording may be cleansed as necessary, and the agents re-trained to ensure compliance with the interaction rules. In this regard, notifications may be provided to both parties of the conversation and/or third parties (e.g. a supervisor) about the violation of the interaction rules.

While the above description sets forth a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computing entity selectively activated or reconfigured by a stored computer program stored. Such a computer program may be stored in a computer readable storage medium, such as, but is not limited to, any type of disk including an optical disk, a CD-ROM, and a magnetic-optical disk, flash memory, a read-only memory (ROM), a random access memory (RAM), a magnetic or optical card, or any type of non-transitory media suitable for storing electronic instructions.

While given components of the system have been described separately, one of ordinary skill will appreciate that some of the functions may be combined or shared in given instructions, program sequences, code portions, and the like.

The techniques herein are not limited to just a pair of participants, as outbound connections may be initiated among multiple parties. Thus, a notion of "conferencing" is also contemplated hereby.

The references above to call center infrastructure is not intended to be limiting, as the techniques may be implemented in any telecommunications-based environment.

The invention claimed is:

1. A method for connecting first and second transaction entities for allowing sale of products or services over the Internet, the method comprising:
   providing, by a processor, for display on a display device, a transaction associated with a product or service provided by the first transaction entity, wherein the transaction is associated with a category of transactions;
   providing, by the processor, for display on the display device, an option to request interaction with the first transaction entity;
   receiving, by the processor, selection of the option to request interaction from the second transaction entity;
   in response to selection of the option, transmitting, by the processor, a command to establish the interaction between the first transaction entity and the second transaction entity, wherein the first and second transaction entities are entities who have agreed to terms of use for the interaction, the terms of use including a prohibition against exchange of personal identification information between the first and second transaction entities during the interaction;
   in response to establishing the interaction, invoking, by the processor, a recording device for automatically recording communication exchanged between the first and second transaction entities during the interaction, and storing the recorded communication in a data storage device;
   invoking, by the processor, a speech analytics engine for performing analysis for the recorded communication;
   identifying, by the speech analytics engine, keywords uttered during the recorded communication;
   determining, by the speech analytics engine, whether the uttered keywords include the personal identification information;
   determining, by the processor, frequency of the keywords determined to include the personal identification information;
   determining, by the processor, whether the frequency is above a preset threshold; and
   preventing, by the processor, one of the first and second transaction entities from engaging in future interactions based on determining that the frequency is above the preset threshold.

2. The method of claim 1, wherein the interaction between the first and second transaction entities is established without disclosing the personal identification information of the first and second transactions entities.

3. The method of claim 1, wherein the personal identification information is contact information used by the first and second transactions entities for general communication including communication unrelated to the transaction.

4. The method of claim 1, wherein in response to the command to establish the interaction, transmitting a first interaction request to the first transaction entity and a second interaction request to the second transaction entity, wherein in response to acceptance of the first and second interaction requests, establishing communication between the first and second transaction entities.

5. The method of claim 1 further comprising:
   retrieving, by the processor, preference information stored for the first transaction entity;
   transmitting, by the processor, the command to establish the interaction consistent with the retrieved preference information.

6. The method of claim 5, wherein the preference relates to at least one of times or media channels for engaging in the interaction.

7. The method of claim 1, wherein the interaction is a telephony interaction.

\* \* \* \* \*